United States Patent [19]

Newbegin

[11] Patent Number: 5,253,807
[45] Date of Patent: Oct. 19, 1993

[54] MULTI-OUTLET EMITTER AND METHOD

[75] Inventor: Edward H. Newbegin, Portland, Oreg.

[73] Assignee: Wade Manufacturing Co., Portland, Oreg.

[21] Appl. No.: 852,530

[22] Filed: Mar. 17, 1992

[51] Int. Cl.$^5$ ................................................ B05B 1/16
[52] U.S. Cl. ........................................ 239/11; 239/74; 239/444; 239/533.13; 239/542; 239/562; 239/600
[58] Field of Search ............... 239/11, 71, 74, 229, 239/436, 442, 444, 533.1, 533.13, 542, 548, 551, 562, 565, 600

[56] References Cited

U.S. PATENT DOCUMENTS

| | | | |
|---|---|---|---|
| 2,598,961 | 6/1952 | Andrus | 239/542 |
| 3,779,462 | 12/1973 | Bruninga | 239/230 |
| 3,799,453 | 3/1974 | Hart | 239/600 |
| 3,814,377 | 6/1974 | Todd | 239/542 |
| 4,036,435 | 7/1977 | Pecaro | 239/542 |
| 4,509,692 | 4/1985 | Moss | 239/542 |
| 4,544,099 | 10/1985 | Norris | 239/533.1 |
| 4,570,858 | 2/1986 | Bintner et al. | 239/71 |
| 4,726,527 | 2/1988 | Mendenhall | 239/542 |
| 4,909,441 | 3/1990 | Christy | 239/533.13 |
| 5,054,690 | 10/1991 | Olson | 239/542 |

Primary Examiner—Andres Kashnikow
Assistant Examiner—Karen B. Merritt
Attorney, Agent, or Firm—Phillips, Moore, Lempio & Finley

[57] ABSTRACT

An emitter has a plurality of circumferentially disposed fittings releasably connected thereon. A pressure-compensated flow control valve is mounted in at least some of the fittings and the control valves have varied flow rates. A plug is inserted into outlets from the emitter not having a fitting/control valve mounted therein. The emitter is adapted to replace a standard sprinkler head of a sprinkler circuit to provide the circuit with both sprinkler and micro-irrigation capabilities.

17 Claims, 1 Drawing Sheet

MULTI-OUTLET EMITTER AND METHOD

TECHNICAL FIELD

This invention relates to a multiple-outlet emitter for use in micro-irrigation systems and more particularly to an emitter and method for discharging water at selectively varied flow rates from the respective outlets thereof.

BACKGROUND ART

A reoccurring problem with present-day irrigation systems tailored for the landscape market has been the inability to effectively synchronize the water discharge rate and time between drip and sprinkler circuits for a common timing cycle. The sprinkler timing cycle is usually in the range of from five to ten minutes and a relatively high flow rate drip system is designed to discharge approximately one gallon of water during this time period. One costly solution to the problem has been to place the drip and sprinkler circuits on separate timing circuits. A typical standard sprinkler is the type of impulse or impact drive sprinkler disclosed in U.S. Pat. No. 5,090,621.

Multiple outlet emitters, such as that disclosed in U.S. Pat. No. 5,054,690, are primarily designed for micro-irrigation purposes only, whereby water is discharged from each outlet at about 1 to 6 gph. Further, emitters of this type must be dismantled for replacement of flow control devices or servicing purposes.

DISCLOSURE OF INVENTION

This invention overcomes the above, briefly described problem by providing a highly efficient and serviceable multi-outlet emitter and method for selectively and expeditiously varying the individual flow rates of fluid discharged from the outlets of the emitter. The emitter is adapted to replace a standard sprayer to incorporate a micro-irrigation sub-circuit into a sprayer circuit.

The emitter comprises a body defining a inlet adapted for connection to a pressurized fluid source, such as a main water line, and a plurality of separate outlets communicating with the inlet and exposed exteriorly on the body. An emitter means is releasably connected to at least some of the outlets for discharging the fluid, such as water, at selectively varied flow rates therefrom.

In a preferred embodiment of this invention, each emitter means comprises a tubular fitting releasably connected to an outlet of the multi-outlet emitter and an interchangeable pressure compensating flow control valve removably mounted in the fitting.

BRIEF DESCRIPTION OF THE DRAWINGS

Other objects and advantages of this invention will become apparent from the following description and accompanying drawings wherein.

BEST MODE FOR CARRYING OUT THE INVENTION

Figure 1:
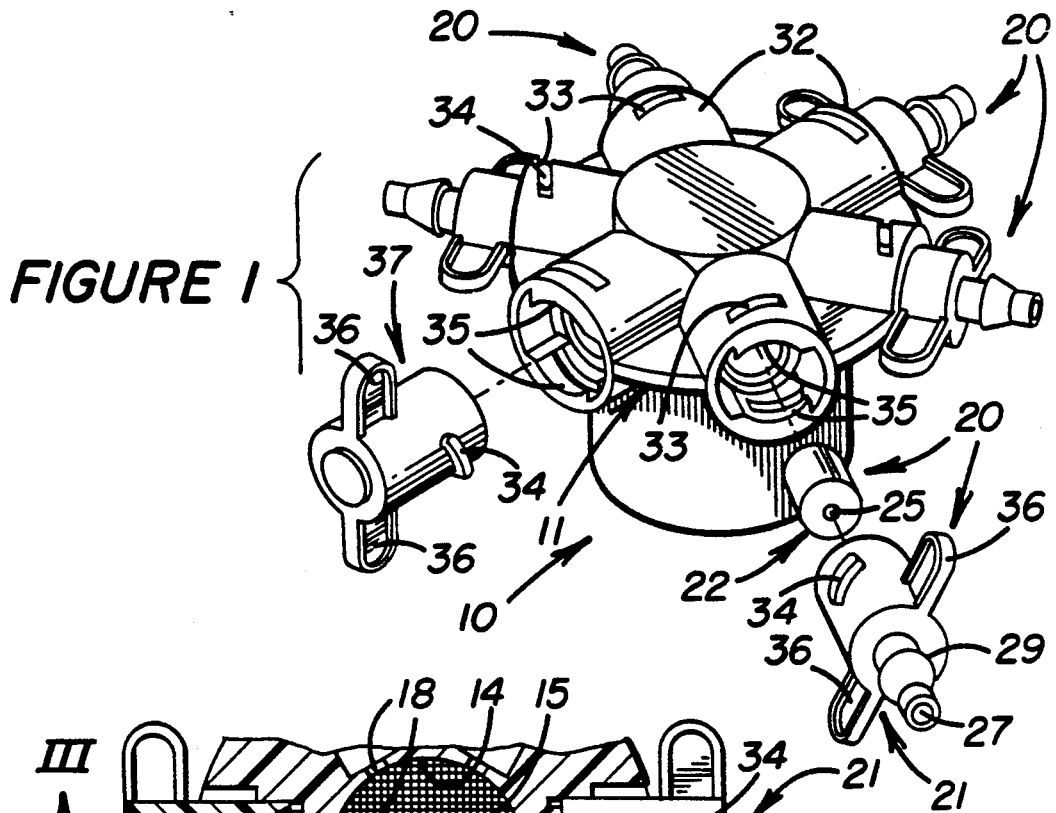
FIG. 1 is an isometric view of a multi-outlet emitter of this invention adapted to be incorporated into an irrigation system.

FIG. 1 illustrates a multi-outlet emitter 10 adapted for micro-irrigation purposes. The emitter comprises a body or housing 11 defining an inlet 12 (FIG. 3) having internal threads 13 formed therein adapted for connection to the external threads defined on the distal end of a standard one-half inch riser pipe (not shown). The riser pipe is adapted in a conventional manner to supply the emitter with a pressurized fluid, such as water, from a main water line maintained at a variable pressure level within the approximate range of from 10 psi to 60 psi. In certain irrigation applications, the water can admixed with sulfuric acid, chlorine, fertilizers or the like.

Figure 2:
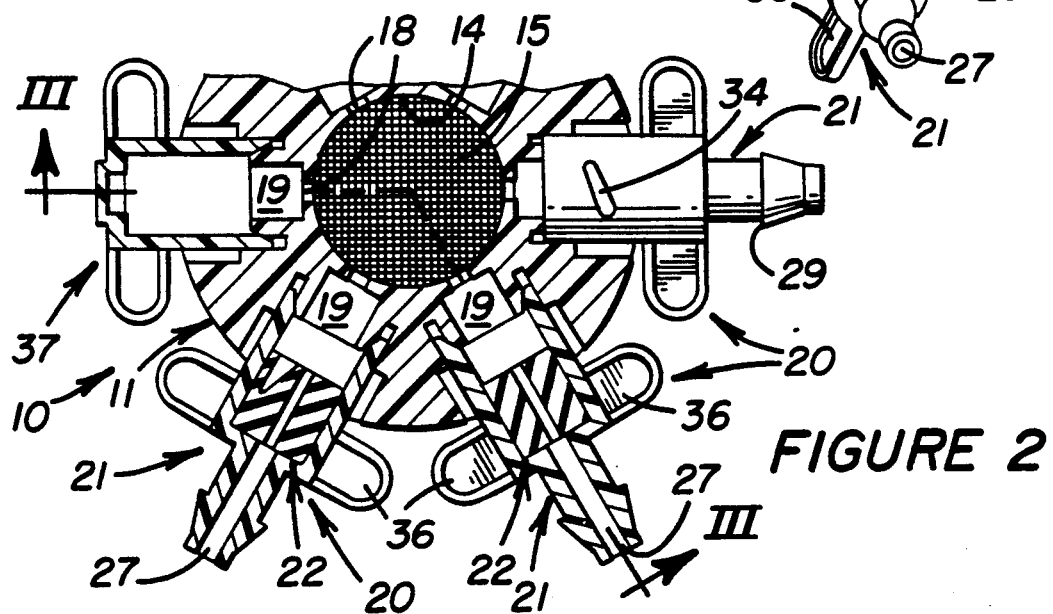
FIG. 2 is a partial transverse sectional view through the emitter.
Figure 3:
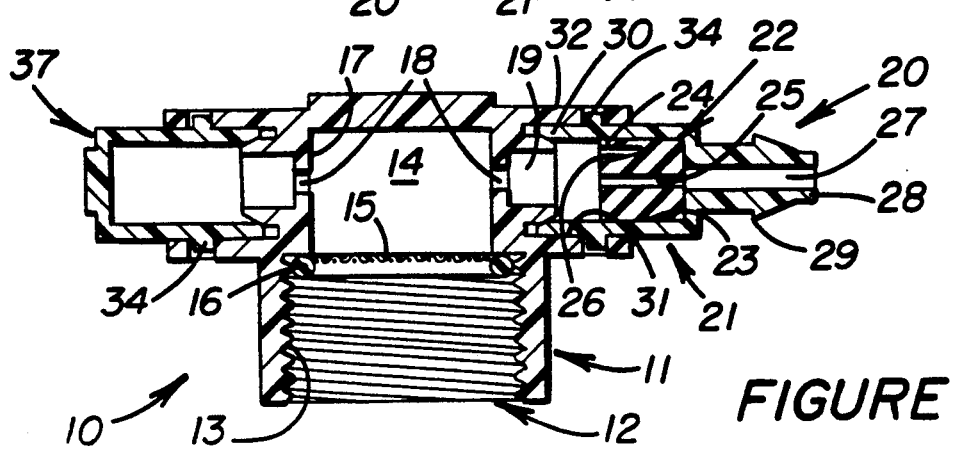
FIG. 3 is a longitudinal sectional view through the emitter, taken in the direction of arrows III—III in FIG. 2.

As shown in FIGS. 2 and 3, pressurized water supplied to inlet 12 is communicated to a cylindrical distributing chamber 14, through a filter, shown in the form of a screen 15. The periphery of the circular screen can be secured to a standard elastomeric O-ring seal 16, adapted to seal the distal end of the riser pipe when emitter 10 is connected thereto. Emitter 10 is vertically disposed on a central longitudinal axis thereof (FIG. 3) and body 11 defines an internal cylindrical partition wall 17, defining chamber 14 therein.

A plurality of circumferentially and equally spaced ports 18 are formed through the partition wall to each communicate with a respective outlet 19. The plurality (e.g., six) of separate outlets 19 thus communicate with inlet 12 and are exposed exteriorly on body 11 for easy access. At least some of the outlets have an emitter means 20 releasably connected thereto for discharging water at selectively varied flow rates for micro-irrigation purposes, as described more fully hereinafter.

As shown in FIG. 3, each of the emitter means comprises a tubular fitting 21 connected to body 11 and a pressure-compensated flow control valve 22 slip-fit within a bore 23, defined in the fitting. As described in U.S. Pat. No. 4,909,441, valve 22 provides pressure-compensating flow control means for discharging the water from the emitter and to a conventional distributing device (dripper, mini-sprayer, etc.) at a preselected and substantially uniform flow rate.

In particular and referring to FIG. 3, each elastomeric valve 22 comprises a flexible diaphragm 24 that will flex into and cooperate with a centrally disposed flow passage 25 to vary the cross-sectional area of the passage in response to pressure fluctuations in a subchamber 26, communicating with outlet 19. Such flexing will maintain the flow rate of the water communicated from flow passage 25 to an outlet passage 27, formed centrally within a distal end 28 of the fitting, at a predetermined near constant flow rate.

As described more fully hereinafter, valves 22 are designed to have different flow rates for individual emitter means 20. Thus, a single multi-outlet emitter 10 can be utilized to irrigate various types of vegetation requiring varied quantities of water per unit time during a common timing cycle. Although the flow rates of the valves can be selected from the approximate overall range of 1.0 gph to 60 gph for irrigation and other water distributing applications, the valve is particularly adapted for micro-irrigation applications requiring from approximately 1.0 gph to 20.0 gph.

As further described in above-referenced U.S. Pat. No. 4,909,441, the disclosure of which is incorporated by reference herein, initial communication of pressurized water from inlet 12 to each valve will initially permit unrestricted flow of water through a fully opened flow passage 25. This feature automatically purges the system and valve of mineral particles and other contaminants that could adversely affect the valve's operation, i.e., the valve is self-purging and self-cleaning. Subsequent increase in water pressure will function to at least partially close the flow passage with the relative opening and closing of the passage by diaphragm 24 being directly responsive to the pressure differential existing between the passage and sub-chamber 26.

A standard circumferential barb 29 is suitably formed on distal end 28 of fitting 21 to secure the end of a standard plastic tubing (not shown) thereon in a conventional manner. The opposite end of the tubing is suitably connected to a water distributing device, such as an emitter or mini-sprayer, in a conventional manner. A proximal end 30 of fitting 21 is slip-fit within a bore 31, defined in one of a series of circumferentially disposed tubular extensions 32 of body 11.

As further shown in FIGS. 1-3, connecting means are provided for releasably connecting and sealing each fitting 21 to a respective extension 32 of the body. Although other types of connecting means can be utilized, the one shown permits the fitting to be twisted (quarter-turn) and locked into place on the body. In particular, the illustrated connecting means comprises a bayonet-type connection including a pair of circumferentially and diametrically disposed slots 33 formed in a respective extension 32 and a pair of tapered lugs 34 formed on fitting 21 to engage into locking engagement within the slots.

In addition, partial tapered threads 35 are formed internally within the outer end of extension 32 to guide lugs 34 into locking engagement within slots 33. Thus, when fitting 21 is twisted in a general clockwise direction into bore 31 in FIG. 1, the lugs will be guided into snap-lock engagement within the slots. As further shown, each of the slots and lugs is slightly spiralled and tapered to accommodate expeditious installation of fittings 21 on body 11.

A pair of diametrically opposed and radially outwardly extending finger-engaging ears 36 are formed externally on each fitting 21 to facilitate manual twisting of the fitting for installation or removal purposes. As described above, releasable connection of the fitting to body 11 facilitates interchangeability of the fitting with another fitting, containing a flow control valve 22 having a differed rating. Each of the fittings, as well as valves 22, can be color-coded to indicate different flow rates. Further, selected ones of outlets 19 can be closed by connecting a plug 37 therein, utilizing the same type of connecting means utilized for connecting fitting 21 to selected ones of the outlets.

From the above description, it can be seen that the method for selectively varying the individual flow rates of multi-outlet emitter 11 comprises the initial step of exposing the plurality of separate outlets 19 to a workman. The method further comprises connecting a first fitting 21, having a first control valve 22 exhibiting a first flow rate, to one of the outlets 19, and then connecting a second tubular fitting 21, having a second valve exhibiting a second flow rate different from the first flow rate, to another one of the outlets. In the preferred embodiment, each of the connecting steps comprises twisting and locking each respective one of the tubular fittings on emitter 10.

The method steps may also include connecting plug 37 to at least one of the outlets and color-coding each of the tubular fittings and/or valves. A more specific application of the method comprises replacing a standard sprinkler, such as the type disclosed in U.S. Pat. No. 5,054,690, with emitter 10 to integrate the emitter into a sprinkler circuit.

INDUSTRIAL APPLICABILITY

Emitter 10 has been developed primarily for landscape watering. In many landscape irrigation systems it is desirable to replace one or more standard sprinkler heads with a drip irrigation circuit. Because of the short timing cycles typical for sprinkler circuits (10 to 30 minutes), it sometimes proves impracticable to install a sufficient number of standard drip emitters or to utilize a separate micro-irrigation circuit to satisfy varied watering requirements.

The most effective system design would find all micro-irrigation devices on separate timing circuits since these devices normally require more time to irrigate than sprays. However, emitters 10 can now be integrated into the same circuit with standard sprinklers of the type disclosed in U.S. Pat. No. 5,090,621, for example.

Because standard sprinklers normally have short run-times (compared to micro-irrigation), multi-outlet emitter 10 was developed to apply relatively large volumes of water per outlet in a few minutes to match sprinkler timing. This capacity makes the emitter ideal for use in circuits which are primarily designed for sprinklers and for conversion of a sprinkler location to drip irrigation.

Each outlet is individually flow-controlled by a preselected valve 22 to deliver a rated discharge of from 15 to 60 psi. The chart below lists the discharges for various minutes of irrigation run-time from five different emitter means 20, i.e., a respective emitter means is adapted to discharge fluid (water) at a selected one of a series of substantially uniform flow rates.

As suggested above, since sprinklers have relatively short run-times (e.g. 15 minutes), an adequate number of micro-irrigation emitters or micro-sprayers must be used to supply plant water requirements during this short period. As indicated, tubular fittings 21 can be color-coded to depict their respective calibrated flow rates.

| GPH PER OUTLET (COLOR) | IRRIGATION RUN-TIME | | | |
|---|---|---|---|---|
| | 5 MIN. | 10 MIN. | 15 MIN. | 20 MIN. |
| 6.5 (BLUE) | .5 GAL | 1.1 GAL. | 1.6 GAL | 2.2 GAL. |
| 10.5 (VIOLET) | .9 GAL | 1.8 GAL. | 2.6 GAL. | 3.5 GAL. |
| 12.5 (GREEN) | 1.0 GAL. | 2.1 GAL. | 3.2 GAL. | 4.2 GAL. |
| 16.0 (YELLOW) | 1.3 GAL. | 2.7 GAL. | 4.0 GAL. | 5.3 GAL. |
| 20.5 (RED) | 1.7 GAL. | 3.4 GAL. | 5.1 GAL. | 6.8 GAL. |

Any appropriate pressure-compensated and flow-controlled drip and micro-irrigation emitter can be designed into or retro-fitted to sprinkler circuits. Sufficient discharge volume should be utilized to deliver enough water during the shorter irrigation duration.

Modifications within the skill of the art can be made to emitter 10 without departing from the scope of this invention, as prescribed by the claims appended hereto.

For example, although emitter means 20 are shown to extend radially outwardly or downwardly from an outer side of body 11, they can be otherwise positioned (e.g., to point upwardly or downwardly) and/or located at an upper or lower side of the body. Wherever located, fittings 21 are exposed exteriorly on body 11 to position them for ready access by a gardener.

It should be noted in FIGS. 1-3 that outlets 19 are exposed exteriorly on body 11 with the body being normally disposed on a vertically disposed central longitudinal axis thereof. At least three emitters 20 are solely spaced about an outer side of the body and such axis to at least substantially lie in the same horizontally disposed plane.

I claim:

1. A multi-outlet emitter adapted for irrigation purposes comprising
   a body defining an inlet adapted for connection to a pressurized fluid source, said body being disposed on a vertically disposed central longitudinal axis thereof,
   at least three separate outlets each communicating with said inlet and exposed exteriorly on said body, and
   at least three emitter means each releasably connected to a respective one of said outlets for discharging said fluid at selectively varied flow rates therefrom, said outlets and said emitter means being solely spaced one-from-another circumferentially about an outer side of said body and said axis to at least substantially lie in a same horizontally disposed plane.

2. The multi-outlet emitter of claim 1 wherein each said emitter means comprises pressure-compensated flow control means for discharging said fluid from a respective emitter means at a selected one of a series of substantially uniform flow rates.

3. The multi-outlet emitter of claim 2 wherein said emitter means further comprises a tubular fitting releasably connected to said body.

4. The multi-outlet emitter of claim 3 wherein said tubular fitting is releasably connected to said body by connecting means for permitting said tubular fitting to be twisted and locked into place on said body.

5. The multi-outlet emitter of claim 4 wherein said connecting means comprises a bayonet connection comprising a plurality of circumferentially disposed slots formed in said body, a plurality of circumferentially disposed lugs formed on said tubular fitting and thread means for permitting said tubular fitting to be twisted into a respective one of said outlets to engage said lugs in locking engagement within said slots.

6. The multi-outlet emitter of claim 4 further comprising finger-engaging means extending radially outwardly from said tubular fitting to be grasped and twisted.

7. The multi-outlet emitter of claim 3 wherein said flow control means is removably mounted in said tubular fitting.

8. The multi-outlet emitter of claim 3 further comprising barbed extension means on an outer end of said tubular fitting for attaching a flexible tube thereto, adapted to communicate said fluid to a fluid distributing device.

9. The multi-outlet emitter of claim 3 wherein each said tubular fitting is color-coded to visually indicate different flow rates for various flow control means.

10. The multi-outlet emitter of claim 1 wherein said emitter means extend radially outwardly relative to said axis.

11. The multi-outlet emitter of claim 1 further comprising a distributing chamber means defined in said body for communicating said inlet with an inlet to each of said emitter means.

12. The multi-outlet emitter of claim 1 further comprising an externally threaded standard one-half inch riser pipe and thread means formed internally within said inlet for releasably connecting said body to said externally threaded riser pipe.

13. The multi-outlet emitter of claim 1 further comprising plug means, releasably connected to at least one of said outlets, for closing such outlet.

14. A method for selectively varying the individual flow rates for a multi-outlet emitter adapted for irrigation purposes comprises the steps of
   exposing a plurality of separate outlets defined exteriorly on said emitter,
   connecting a first tubular fitting, having a first flow control valve exhibiting a first flow rate, to one of said outlets,
   connecting a second tubular fitting, having a second flow control valve exhibiting a second flow rate different than said first flow rate, to another one of said outlets, and
   replacing a standard sprinkler, threadably connected to external screw threads formed at an outlet from a standard one-half inch riser pipe, with said multi-outlet emitter by threadably connecting internal screw threads formed at an inlet to said emitter to the external screw threads formed at the outlet from said riser pipe.

15. The method of claim 14 wherein each of said connecting steps comprises twisting and locking each respective one of said first and second tubular fittings on said emitter.

16. The method of claim 14 further comprising connecting a plug to another one of said outlets.

17. The method of claim 14 further comprising color-coding each of said first and second tubular fittings to visually indicate different flow rates for the respective flow control valves thereof.

* * * * *